(12) United States Patent
Hanse

(10) Patent No.: US 6,968,281 B2
(45) Date of Patent: Nov. 22, 2005

(54) METHOD FOR CALIBRATING AN INERTIAL MEASUREMENT UNIT

(75) Inventor: Joel G. Hanse, Edina, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/852,043

(22) Filed: May 24, 2004

(65) Prior Publication Data

US 2004/0211238 A1  Oct. 28, 2004

Related U.S. Application Data

(62) Division of application No. 10/011,459, filed on Nov. 6, 2001, now Pat. No. 6,778,924.

(51) Int. Cl.$^7$ ............................................. G01P 21/00
(52) U.S. Cl. ............................ 702/85; 73/1.38; 702/96
(58) Field of Search ............................... 73/1.37–1.38, 73/1.74–1.79, 1.88; 702/85–88, 92–94, 96–97; 33/502, 326, 356

(56) References Cited

U.S. PATENT DOCUMENTS

| | | | |
|---|---|---|---|
| 3,266,052 A | 8/1966 | Yamron | 73/1.78 |
| 4,168,524 A | 9/1979 | Soltz et al. | 702/93 X |
| 4,188,816 A | 2/1980 | Mairson | 73/1.38 |
| 5,115,570 A | 5/1992 | Krogmann et al. | 33/326 |
| 5,277,053 A | 1/1994 | McLane et al. | 73/1.38 |
| 5,321,638 A | 6/1994 | Witney | |
| 5,531,115 A | 7/1996 | Erdley | 73/1.37 X |
| 5,892,152 A | 4/1999 | Darling et al. | 73/1.77 X |
| 6,480,152 B2 | 11/2002 | Lin et al. | 342/357.14 |
| 6,516,272 B2 | 2/2003 | Lin | 701/214 |
| 6,553,322 B1 | 4/2003 | Ignagni | 702/94 X |
| 6,640,609 B1 * | 11/2003 | Nadkarni et al. | 73/1.37 |
| 6,738,721 B1 * | 5/2004 | Drucke et al. | 73/1.38 X |
| 6,823,279 B1 * | 11/2004 | Nadkarni et al. | 702/104 |
| 2002/0100310 A1 | 8/2002 | Begin | 73/1.37 |

FOREIGN PATENT DOCUMENTS

| | | | | |
|---|---|---|---|---|
| JP | 08313262 | | 11/1996 | G01C 19/00 |
| JP | 11118507 A | | 4/1999 | G01C 19/00 |
| JP | 2001033479 A | | 2/2001 | G01P 21/00 |
| WO | WO 99/32852 | | 7/1999 | G01C 21/20 |
| WO | WO 200037891 A1 | | 6/2000 | G01C 25/00 |

OTHER PUBLICATIONS

Derwent-Acc-No. 2001-298434—abstract of RU 2162230 C1, Jan. 20, 2001, Achildiev et al. "Wide-range bed to test platform-free inertial measuring units.".

* cited by examiner

Primary Examiner—Thomas P Noland
(74) Attorney, Agent, or Firm—McDonnell Boehnen Hulbert & Berghoff LLP

(57) ABSTRACT

A method for testing inertial measurement devices on a multi-axis rate table without having to utilize slip rings to transfer signals between the inertial measurement devices and remote processors by incorporating a processor internal to the inertial measurement devices and transferring the signals directly to the processors for determining and storing the calibration coefficients of the inertial measurement devices internally so that they are self calibrating.

15 Claims, 2 Drawing Sheets

METHOD FOR CALIBRATING AN INERTIAL MEASUREMENT UNIT

REFERENCE TO A RELATED APPLICATION

This application is a divisional application of and claims priority to U.S. patent application Ser. No. 10/011,459, filed Nov. 6, 2001, which is incorporated herein by reference and which has issued as U.S. Pat. No. 6,778,924.

BACKGROUND

1. Field of Invention

This invention relates to an improvement to eliminate the need for slip rings in calibration system utilizing a signal processor that receives the outputs of one or more motion sensing devices mounted on a rotary platform. The devices are subjected to known conditions of rotary motion and the outputs are compared with the known conditions to determine any errors there between to produce correction factors that are applied to the outputs to more accurately indicate the known conditions. In the preferred embodiment, the invention is used with calibration equipment for inertial measurement units (IMU's) mounted on a rate table and, more particularly, to a self contained system that avoids the use of slip ring connections for transferring signals from the IMU's to the signal processor.

2. Description of Related Art

Heretofore, the calibration of IMU's has required the mounting of the IMU under test on a multi-axis rate table, subjecting the IMU to predetermined known motions (e.g. rates and accelerations) in the various axes (e.g. three perpendicular axes such as pitch, roll and yaw), and at various known temperatures and other environmental conditions, determining the response of the IMU to these input environmental condition values and transmitting the output signals indicative of such values through a slip ring assembly to a remote computer or processor which includes test software that operates to compare the IMU outputs with the predetermined known values and to determine any errors so as to produce calibration coefficients which can be used to correct the errors in the outputs. The calibration coefficients are stored in a memory, internal to the IMU, and which are then used with calibration software in the IMU to add or subtract the correction values from future IMU outputs, at the various rates and temperatures, etc.

While it is not necessary for an understanding of the invention, it is believed helpful to consider the operation of the prior art in establishing the correction values. Three major causes of inaccuracy in an IMU are scale factor, bias and misalignment. These three factors may also vary with temperature so temperature drift may be considered a fourth factor. There are others, but these tend to be the most important to be corrected by the calibration system and will be used here for simplicity.

Again, for simplicity, assume that a single axis sensor, such as an accelerometer, is mounted on a base that will be used in actual practice and assume that this base is mounted on a rate table and in an oven. If the base is mounted so that the sensing axis of the accelerometer is parallel to the gravitational axis, the IMU should produce a signal indicating "+1 g" when upright and "−1 g" when inverted, without any motion of the rate table. (Outputs greater than 1 g are produced by rotation of a table such as would be experienced on a centrifuge). If there is a scale factor error of, say, +1.0%, then at +1 g, the output would read +1.01 g and at a −1 g, the output would read −1.01 g.

Accordingly, to correct this error, one would multiply the output by 1.00/1.01=0.99. If there was a bias error of say +0.2 g, then at +1 g, the output would be 1.2 g and at −1 g the output would be −0.8 g. To correct this error, the value (1.2+(−0.8))/2=0.4/2=0.2 g would be subtracted from the output.

Misalignment errors are normally determined when the sensing axis is perpendicular to the gravitational field where a perfect alignment would produce an output of 0.0 g. The correction factor for misalignment is determined by observing the acceleration error from the accelerometer as the accelerometer is rotated about its input mounting axis placed in the 0 g orientation. The misalignment correction factor is then calculated by using a small percentage of the other two acceleration axes outputs of an orthogonal system.

All of the tests will then be re-conducted at a plurality of various temperatures so that the memory will contain the proper correction coefficients for all temperatures to be encountered in actual use. It should be noted that in addition to temperature, there are other environmental conditions, such as humidity altitude, and vibration that may affect the outputs.

In all cases, all of the output signals must be sent through the slip ring assembly to the processor where the correction coefficients are determined and then all of the correction coefficients must be transmitted from the processor back through the slip ring assembly to the memory in the IMU.

Now working at an IMU level with three axis accelerometers, then the simplified tests above will have to be repeated along all three of the axis of interest but, although more complicated, the result will still be a lookup table in the IMU which will correct for the major errors in all three axes and at all temperatures to be encountered. It should be understood that the tests may use more advanced algorithms than the simplified equations above, to detect the errors along the desired axes. For example, by aligning the IMU along axes that are skew to the three major axes, a new vector output may be obtained. Then the new vectors may be mathematically resolved to provide the desired information along the three major axes without as many repetitions of the application of various g forces to the IMU.

In any event, and regardless of the processor algorithm used, the requirement for using a slip ring assembly to read the IMU output values presents a considerable problem since such assemblies are very expensive particularly, when it is desired to calibrate a large plurality of IMU's (e.g. 32 units) at the same time.

SUMMARY

The present invention eliminates the need for slip-ring assemblies to obtain the signals from the IMU's for presentation to the external processor by building the IMU's with internal processors capable of using the test software to determine the calibration coefficients and the calibration software to modify the IMU outputs for customer use. This also eliminates the need for external remote processors and simplifies the calibration process at a greatly reduced cost.

BRIEF DESCRIPTION OF THE DRAWINGS

Exemplary embodiments of the present invention are described herein with reference to the drawings, in which.

DETAILED DESCRIPTION

Figure 1:
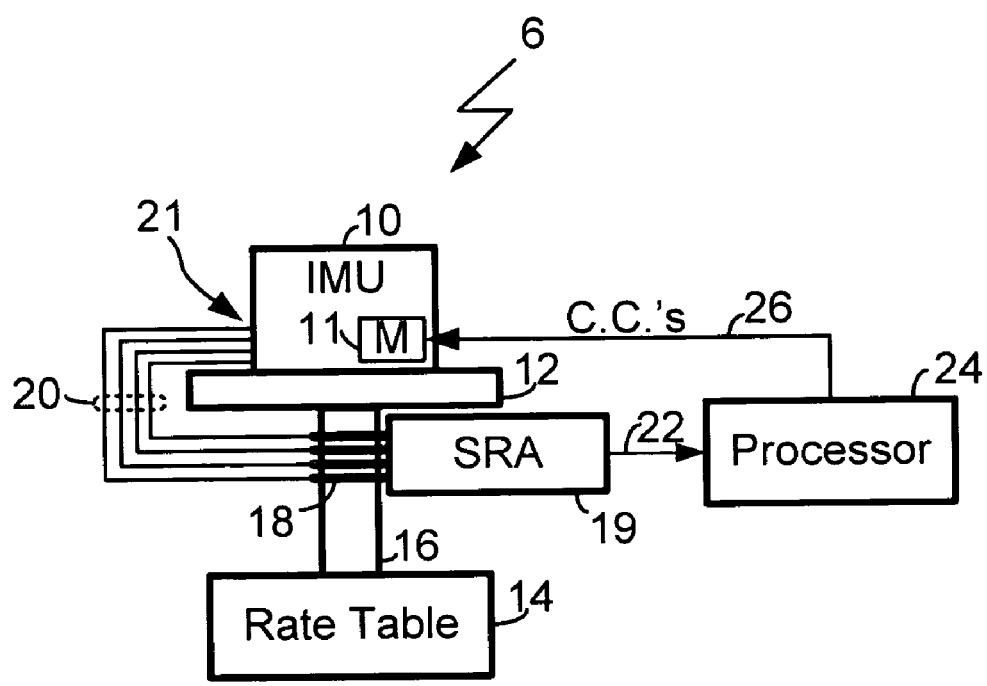
FIG. 1 is a schematic representation of the prior art system for calibrating IMU's.

A prior art system similar to that described in the above referenced publication is shown in FIG. 1. In FIG. 1, the desired environment, such as various temperatures likely to be encountered in actual use, is shown by an arrow 6. This environment may be provided by a heater, cooler or oven, (not shown) well known in the art. An IMU 10 such as a gyroscope or accelerometer, or a combination comprised of a plurality of gyroscopes and accelerometer, having an internal memory 11 is shown mounted on a platform 12 that is connected to a multi-axis rate table 14 whose purpose is to subject the IMU to various motions in various axes to determine how it responds. A shaft 16 is shown connected between the rate table 14 and the platform 12 and is shown carrying a plurality of slip rings 18 as part of slip ring assembly 19. Slip rings 18 are connected by lines 20 to receive the IMU 10 outputs, shown by arrow 21. Outputs 21 carry signals indicative of the motion sensed by the IMU 10 and slip ring assembly 20 presents these signals over a line shown as arrow 22 to a remote computer or processor 24. Processor 24, as described above, compares the IMU output signals with the known predetermined values of input motion provided by rate table, and operates to determine any errors and calculates the desired calibration coefficients.

At the conclusion of the test, the processor will transmit the calibration coefficients back through the slip rings 18 to the internal memory 11 or, if preferred, the rate table may be stopped and the processor 24 connected to download the calibration coefficients over a line shown as arrow 26. Thereafter, IMU 10 operates with the stored calibration coefficient values to modify the outputs 20 at the various temperatures so that more accurate values for the motions detected by the IMU 10 are obtained for customer use. If it is desired to check the recalibrated outputs, the test may then be re-conducted and the new outputs again checked against the known environment inputs with any more accurate calibration coefficients stored in memory 11.

Figure 2:
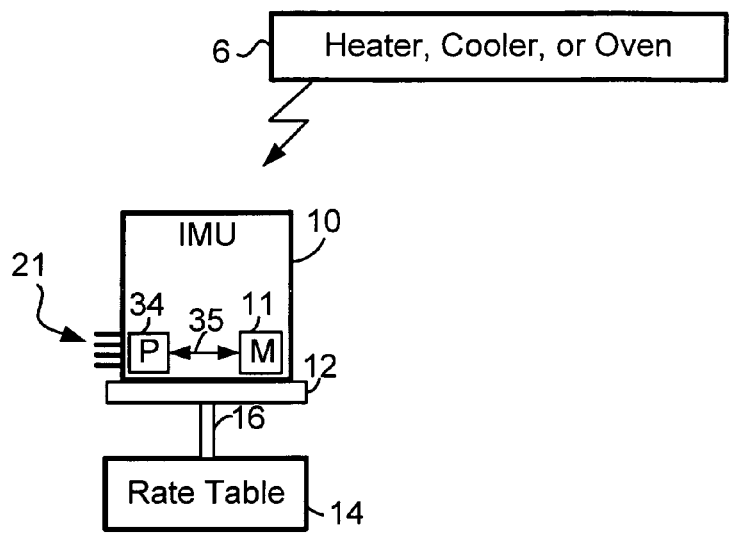
FIG. 2 is a schematic representation of the calibration system of the present invention; and, FIG. 3 is a flow diagram for the calibration of IMU's using the present invention.

FIG. 2 shows the apparatus of the present invention. In FIG. 2, the environment 6 the IMU 10 with the internal memory 11 and the outputs 21, the platform 12 the rate table 14 and the shaft 16 are the same as in FIG. 1 although shaft 16 no longer is required to carry slip rings as will be explained. The IMU 10 is shown mounted on platform 12 as in FIG. 1, but in FIG. 2 the slip rings 18 the connectors 20 and the slip ring assembly 19 have been removed.

The processor 24 of FIG. 1 has also been eliminated and a processor 34 having the same function is now shown internal to the IMU 10. Processor 34 operates in the same manner as processor 24 of FIG. 1, but is now internally connected to the outputs 20 of the IMU and to the internal IMU memory 11 as shown by a double ended arrow 35. Processor 34 compares the IMU output signals 21 with the known predetermined environmental values of input motion and temperature provided by rate table and operates to calculate the desired calibration coefficients.

With the present invention, it is no longer necessary to utilize slip rings to carry the signals to the processor or the calibration signals back to the internal memory, (or to wait for the conclusion of the test to store the calibration coefficients) since the calibration coefficients may be immediately stored in the IMU internal memory 11 during the test. As was the case in FIG. 1, the IMU 10 will then be able to operate with the stored calibration coefficient values to modify the outputs 20 of the IMU 10 at various temperatures so that more accurate values for the motions detected by the IMU 10 are obtained for customer use.

It should be noted that re-checking of the calibrated outputs against the known environmental values of the rate table input may now be accomplished without stopping the rate table, transferring the calibration values to the IMU memory and restarting the test, since the recalibration values are already stored in the IMU memory. This will also save the time that may be required to re-establish the desired temperature environment. It should also be noted that a multiplicity of IMU's may now be simultaneously tested without the difficulty of connecting each IMU to slip rings for external handling thus achieving a great saving in cost, time and complexity.

Figure 3:
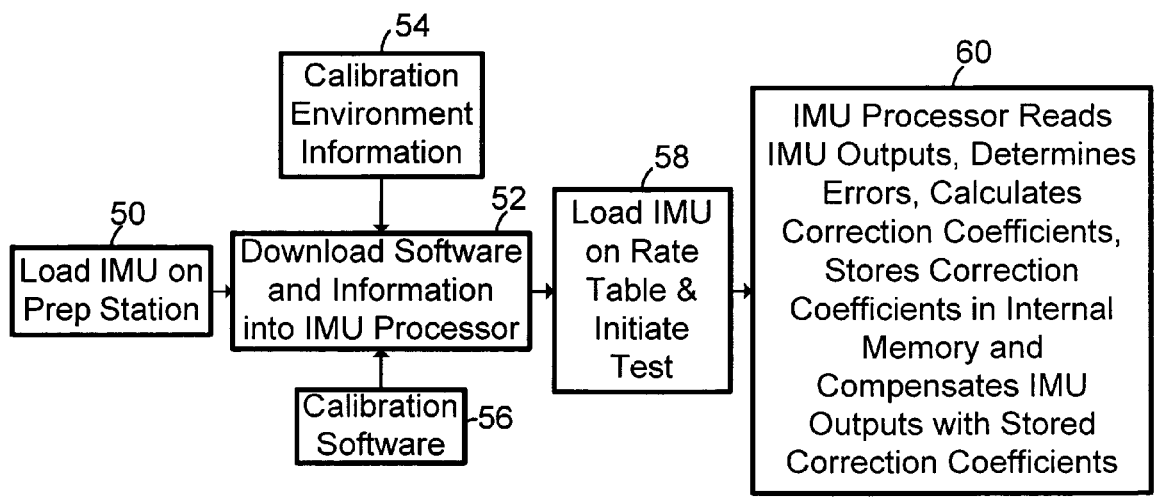

FIG. 3 shows a flow chart for the operation of the improved IMU calibration test. In FIG. 3, box 50 indicates that the first step is to load the IMU's on a prep-station. The prep-station is merely an initial place where the each IMU may be loaded with the test and calibration software to be used and where the predetermined rate table values and temperatures to which the IMU's are to be subjected are inputted. This is performed at the next step, shown by box 52. Box 52 indicates that the calibration environment information from a box 54 and the test and calibration software from a box 56 are downloaded into the IMU. After downloading the necessary information and software into each IMU, the next step is to mount the IMU's on the rate table and to initiate the test as is indicated by a box 58. As indicated in the next box 60 during the test, the internal IMU processor reads the IMU outputs, determines the errors, calculates the correction coefficients, and stores the correction coefficients in the internal memory. Thereafter, the IMU, using the calibration software, changes the outputs in accordance with the stored correction coefficients to provide the more accurate values for customer use.

It is thus seen that I have provided an improved calibration test system for IMU's and have greatly reduced the complexity, cost and time involved to test them. Of course, the invention may find application in calibrating devices other than IMU's which are tested on rotating tables and which employ slip rings to transfer the output signals to a remote processor that detects errors and stores them in the devices for future correction.

Furthermore, other changes to the structures and processes described herein may occur to those skilled in the art. For example, the software and environmental information may be loaded into the IMU after it is loaded on the rate table and environmental conditions other than temperature, (such as vibration or altitude conditions), may be applied to the test devices.

Accordingly, I do not wish to be limited to the specific showings used in connection with the description of the preferred embodiment. The scope of the invention may be determined by the claims appended hereto.

I claim:

1. In a system that includes an inertial measurement unit having an internal memory device and an internal processor, a prep-station having test and calibration software, and a rate table that subjects the inertial measurement unit to a known plurality of motion and environmental conditions, a method of using the inertial measurement unit comprising:
loading the inertial measurement unit on the prep-station;
loading the processor, via the prep-station, with the test and calibration software and values of the known motion and environmental conditions;
placing the inertial measurement unit on the rate table;

subjecting the inertial measurement unit, during a test, to the known plurality of motion and environmental conditions while the inertial measurement unit is on the rate table; and executing the test software, at the processor, during the test to read outputs of the inertial measurement unit, determine errors, and calculate correction coefficients, wherein the outputs of the inertial measurement unit are sent to the processor via a path that does not include slip rings.

2. The method of claim 1, further comprising storing the correction coefficients in the internal memory device.

3. The method of claim 2, wherein storing the correction coefficients occurs during the test.

4. The method of claim 2, further comprising executing the calibration software, at the processor after the test, to compensate outputs of the inertial measurement unit with the stored correction coefficients.

5. The method of claim 1, wherein subjecting the inertial measurement unit to the known plurality of motion conditions includes subjecting the inertial measurement unit to a rate of motion about at least one predetermined axis.

6. The method of claim 1, wherein subjecting the inertial measurement unit to the known plurality of motion conditions includes subjecting the inertial measurement unit to a rate of motion about three mutually perpendicular axes.

7. The method of claim 1, wherein subjecting the inertial measurement unit to the known plurality of environmental conditions includes subjecting the inertial measurement unit to known vibration conditions.

8. The method of claim 1, wherein subjecting the inertial measurement unit to the known plurality of environmental conditions includes subjecting the inertial measurement unit to known altitude conditions.

9. The method of claim 1, wherein subjecting the inertial measurement unit to the known plurality of environmental conditions includes subjecting the inertial measurement unit to known temperatures.

10. A method of performing calibration tests on an inertial measurement unit, the method comprising:

providing a processor internal to the inertial measurement unit;

connecting the processor to receive outputs of the inertial measurement unit, wherein the outputs of the inertial measurement unit do not pass through slip rings;

loading the processor with test and calibration software and value of known motion and environmental conditions; and executing the test and calibration software at the processor while subjecting the inertial measurement unit to the known motion and environmental conditions, wherein excuting the test and calibration software includes the steps of (i) reading the outputs of the inertial measurement unit, (ii) determining errors, (iii) calculating correction coefficents at the processorm and (v) storing the correction coefficients at the inertial measurement unit.

11. The method of claim 10, further comprising modifying the outputs of the inertial measurement unit in accordance with the correction coefficients to produce more accurate outputs.

12. The method of claim 10, further comprising mounting the inertial measurement unit on a test table; and operating the test table to subject the the inertial measurement unit to the known motion conditions.

13. The method of claim 12, further comprising modifying the outputs of the inertial measurement unit in accordance with the correction coefficients to produce more accurate outputs.

14. The method of claim 10, further comprising:

mounting the inertial measurement unit on a three-axis table; and operating the three-axis table to subject the inertial measurement unit to various motions in various axes.

15. The method of claim 14, further comprising:

operating an oven to establish a desired temperature environment to which the inertial measurement unit is subjected.

* * * * *

UNITED STATES PATENT AND TRADEMARK OFFICE
CERTIFICATE OF CORRECTION

PATENT NO. : 6,968,281 B2  
APPLICATION NO. : 10/852043  
DATED : November 22, 2005  
INVENTOR(S) : Joel G. Hanse It is certified that error appears in the above-identified patent and that said Letters Patent is hereby corrected as shown below:

Column 6, line 6, please delete "value", replace with -- values --.  
Column 6, line 14, please delete "processorm", replace with -- processor, --.  
Column 6, line 15, please delete "(v)", replace with --(iv) --.  
Column 6, line 24, please delete the second "the", so that lines 24 and 25 read as  
-- operating the test table to subject the inertial measurement unit to the known motion conditions. --.

Signed and Sealed this

Nineteenth Day of June, 2007

JON W. DUDAS  
*Director of the United States Patent and Trademark Office*